W. COOPER.
REFRIGERATING APPARATUS.
APPLICATION FILED JAN. 27, 1910.
1,080,540.
Patented Dec. 9, 1913.
2 SHEETS—SHEET 1.
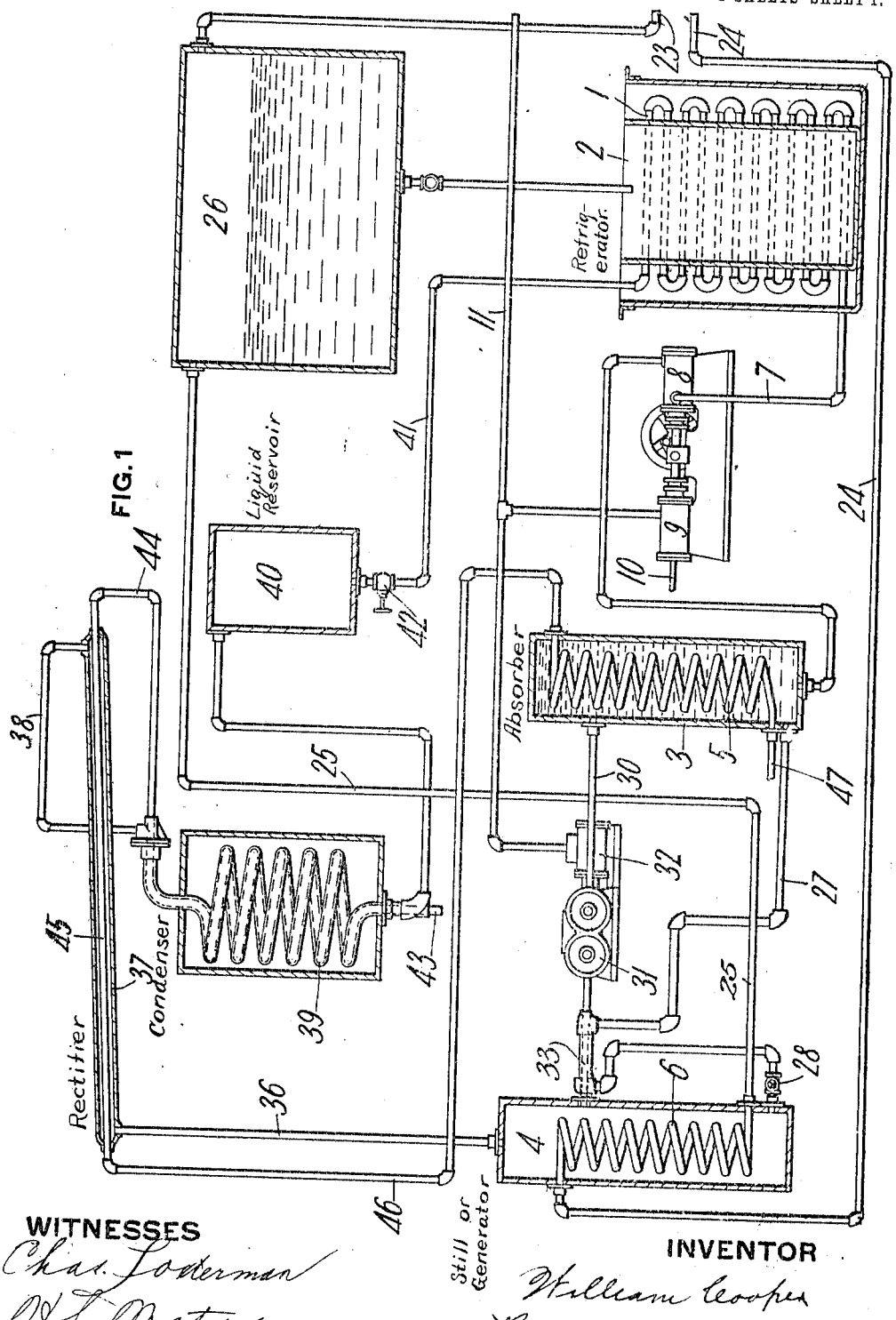

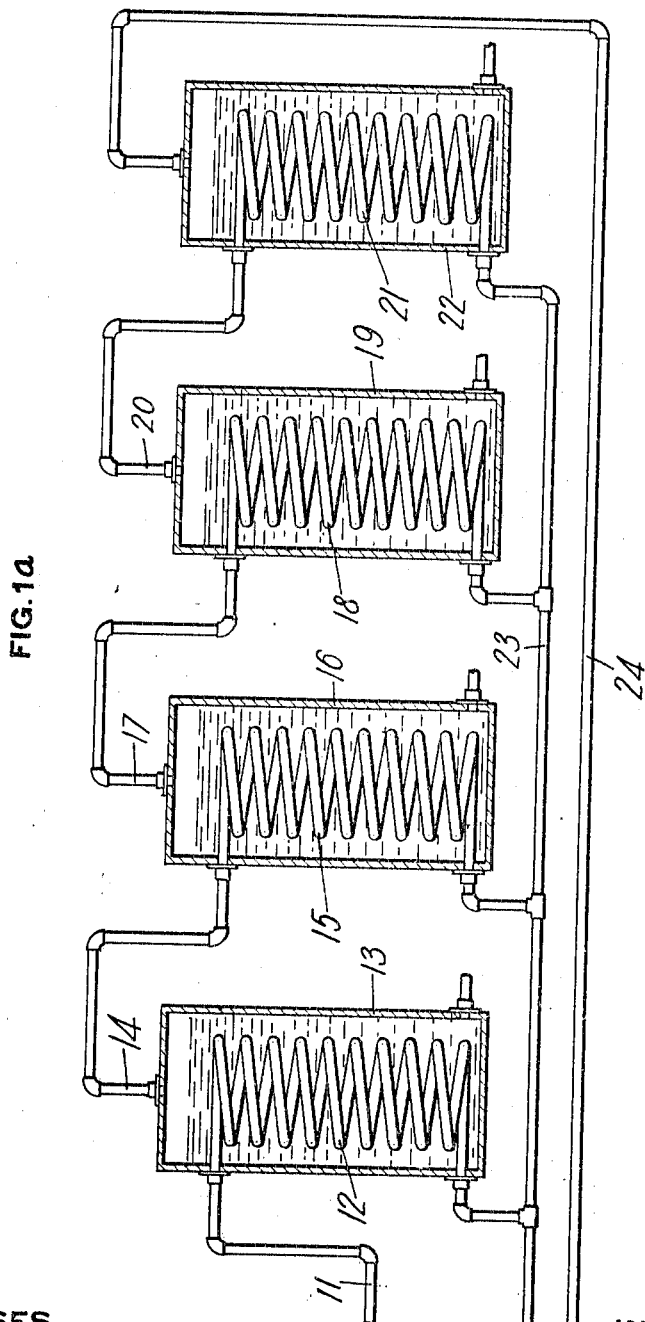

ated Dec. 9, 1913.
UNITED STATES PATENT OFFICE.

WILLIAM COOPER, OF WILKINSBURG, PENNSYLVANIA, ASSIGNOR TO GENERAL REFRIGERATING COMPANY, OF PITTSBURGH, PENNSYLVANIA, A CORPORATION OF WEST VIRGINIA.

REFRIGERATING APPARATUS.

1,080,540.   Specification of Letters Patent.   Patented Dec. 9, 1913.

Application filed January 27, 1910. Serial No. 540,421.

*To all whom it may concern:*

Be it known that I, WILLIAM COOPER, a resident of Wilkinsburg, in the county of Allegheny and State of Pennsylvania, have invented a new and useful Improvement in Refrigerating Apparatus, of which the following is a specification.

This invention relates to refrigerating systems and more particularly to systems of the absorption type.

The object of the invention is to produce a system of this kind which is more economical and which has a higher efficiency than prior systems of the same type.

Generally stated, the invention depends for its higher efficiency on the relatively small amount of heat required to distil any gas from a very strong aqua solution of such gas.

It is well known that an aqua solution of any gas when confined in a closed receptacle exerts a pressure on the walls of the receptacle. The amount of this pressure depends upon two things:—the strength of the solution and the temperature. At any given strength of solution the pressure will be higher as the temperature is higher and at any given temperature the pressure will be higher as the solution is made stronger. In order to effect the economy sought it is therefore necessary to obtain a strong solution from which to distil the gas used as the refrigerating agent. As the temperature of the solution is usually determined by the cooling water available and cannot be lowered below a certain minimum which does not usually give the strength of solution desired at the pressure of the gas returning from the refrigerating apparatus, it is necessary to increase the pressure of the gas to get the strength of solution desired. Hence means are provided for compressing the gas coming from the expansion or evaporation devices and forcing the same into the absorber to produce a very strong aqua solution from which the gas can be distilled with a relatively small amount of heat.

In the accompanying drawings, Figures 1 and 1ª show diagrammatically an arrangement of apparatus comprising my improved system.

In the drawing, 1 indicates an expansion coil or other suitable evaporating device in which liquid ammonia is evaporated to produce the refrigerating effect. This is shown located in an ice forming chamber or receptacle 2. The absorber is shown at 3, and the ammonia generator or still at 4. These may be any well known type of devices of these kinds. As shown, the absorber is fitted with a cooling coil 5 and the generator is fitted with a steam heating coil 6.

In the connection 7 leading from the evaporating device 1 to the absorber is placed a suitable compressor 8 for compressing the ammonia gas and forcing the same into the absorber to produce a very strong aqua solution of ammonia. This compressor may be of any suitable type but for purposes of economy I prefer a steam driven compressor, the steam engine being indicated at 9 with steam supply pipe 10 connected thereto and coming from a suitable boiler, and pipe 11 connected to the exhaust thereof.

The steam exhaust pipe 11 leads to a suitable distilling apparatus for providing the distilled water from which ice is made. Preferably, a multiple-effect distilling apparatus such as shown is used, the particular one shown securing four distillations each yielding the same amount of water as the weight of initial charge of steam. As illustrated, the exhaust steam pipe 11 is connected to a coil 12 in a water vessel 13. From the upper part of this vessel 13 a steam pipe 14 leads to coil 15 in vessel 16, and from the upper end of this, in turn, leads a steam pipe 17 to coil 18 in vessel 19, and in turn from the upper end of this vessel a steam pipe 20 leads to a coil 21 in a vessel 22. Additional coils and vessels can be supplied by merely extending the system shown. The outlets from all of the coils 12, 15, 18 and 21 are connected to pipe 23 discharging into a reservoir or storage tank 26, from which a pipe leads to the ice forming chamber 2.

The steam coming from the engine is at quite a high pressure, say 100 pounds to the square inch. In coil 12 this is condensed but in so doing produces in vessel 13 steam at a reduced pressure, say 75 pounds to the square inch. This steam is condensed in coil 15, and in being condensed generates in vessel 16 steam at a still lower pressure, say 50 pounds per square inch, which in turn is condensed in coil 18 but in being condensed generates steam in vessel 19 at, say, 25 pounds per square inch, and this again is condensed in coil 21 producing steam at still lower pressure, say atmospheric pressure. The low pressure steam from the last unit of the water distilling apparatus is conducted through pipe 24 to the heating coil 6 of the ammonia generator 4, and is condensed therein and conducted by pipe 25 to the storage tank 26 from which the pipe leads to the ice making chamber or receptacle 2.

With the system above described, if steam of sufficiently high pressure is used to operate the compressor 8, then the exhaust steam will be sufficient to distil all the water needed for making ice and also for distilling the ammonia from the aqua solution in the ammonia generator. Consequently, the power necessary to compress the low pressure gas as well as distil the water for ice making is supplied by the expenditure of very little energy, and without the use of cooling water, since the ammonia generator itself condenses the steam used in the water distilling apparatus. The ammonia generator is the place where the greatest portion of the heat in the original steam is used and this is where the greatest economy is effected. Distillation of the water is effected primarily at the expense of the pressure of the steam and not of its latent heat, the latter being utilized in the ammonia generator.

Between the absorber and ammonia generator and preferably near the bottom thereof, is a connection 27 provided with a valve 28 for conducting the weak aqua solution from the generator to the absorber. The strong solution passes from the absorber to the generator through a pipe 30 in which is provided a pump 31 for forcing the solution into the generator. This pump also preferably is steam driven being shown as driven by steam engine 32, the exhaust steam from which is added to the exhaust steam from the compressor 8 for the purpose of distilling water for ice making as above described. In the connection between this pump and the generator is an interchanger or exchanger 33 for the weak and strong solutions, said connection being in the form of a double tube with the inner tube so arranged that the weak warm solution passes through the outer tube from the generator to the absorber while the strong solution from the absorber to the generator passes through the inner tube. The two solutions flow in contrary directions and in this way the strong solution is somewhat heated by the weak solution.

The ammonia gas distilled in generator 4 passes through pipe 36 to a rectifier 37 from which a pipe 38 leads to the condenser 39. From the condenser the liquid ammonia passes into a storage receptacle 40 and thence through pipe 41 to the expansion coil or evaporator 1. In pipe 41 is placed an expansion valve 42 of any well known construction. The rectifier and condenser are in the forms of large tubes through which the ammonia vapor passes and are both cooled. The cooling water enters through pipe 43 in the lower part of the condenser, passes through the condenser as shown and is conducted by pipe 44 to pipe 45 which extends through the rectifier and is thence conducted by pipe 46 to the cooling coil 5 in the absorber 3. The waste water escapes through pipe 47.

The operation of the system described is in general the same as any absorption system with the exception of the compression of the low pressure ammonia gas before entering the absorber and the utilization of the exhaust steam from the compressor and also of the ammonia pump, for distilling water for ice making and for heating the ammonia generator. As the strength of the aqua solution depends upon the pressure at any given temperature, it is only a question of making the pressure high enough to get any strength of solution desired. Preferably, the compressor engine 9 will be operated with steam at high pressure, say 300 pounds to the square inch, so that the exhaust steam escaping from the same will still be at a high pressure. In the water distilling apparatus the tension or pressure of the steam is the principal feature utilized in distilling the water while the latent heat of the steam is practically all expended in the ammonia generator. The solution in the absorber produced by the compression is very strong, much stronger than would be normal under ordinary operating conditions, that is, much stronger than would be due to the pressure in the evaporator. In fact a solution is produced in which the refrigerating agent, that is, the ammonia, is more by weight than the absorbing agent, that is, the water. On account of such strong solution it requires only a relatively small amount of heat to distil the ammonia therefrom. The exhaust steam coming from the water distilling apparatus is ample for this purpose. In fact two or more pounds of ammonia gas are distilled for each pound of steam condensed in the distilling apparatus.

The system as a whole is not only efficient but highly economical.

What I claim is:

1. In an absorption refrigerating system, the combination of an ammonia generator, an absorber connected thereto to deliver aqua ammonia to said generator, a steam driven pump in the connection between the absorber and generator, an expansion device, a steam driven compressor in the connection between the expansion device and the absorber for compressing the ammonia gas coming from the expansion device, water distilling apparatus and connections from said steam compressor and said steam pump to said apparatus, whereby the exhaust steam from the compressor and pump heats said apparatus.

2. In an absorption refrigerating system, the combination of an ammonia generator, an absorber, a pump and exchanger connecting the absorber and generator, an expansion device, and a compressor in the connection between the expansion device and the absorber for compressing the ammonia gas coming from the expansion device and producing a strong aqua solution in the absorber.

3. In an absorption refrigerating system, the combination of an ammonia generator, an absorber connected thereto to deliver aqua ammonia to said generator, an expansion device, a steam driven compressor in the connection between the expansion device and the absorber for compressing the ammonia gas coming from the expansion device and producing a strong aqua solution in the absorber, water distilling apparatus, and connections whereby the exhaust steam from said compressor heats the water distilling apparatus.

4. In an absorption refrigerating system, the combination of an ammonia generator, an absorber connected thereto to deliver aqua ammonia to said generator, an expansion device, a steam driven compressor in the connection between the expansion device and the absorber, water distilling apparatus, connections for conducting the exhaust steam from the compressor to said water distilling apparatus, and connections for conducting waste steam from the distilling apparatus to heating means for the ammonia generator.

In testimony whereof, I have hereunto set my hand.

WILLIAM COOPER.

Witnesses:
  B. B. HINES,
  M. J. ARNOLD.